(12) United States Patent
Piggott et al.

(10) Patent No.: US 8,864,451 B2
(45) Date of Patent: Oct. 21, 2014

(54) INTERSTAGE SEAL

(75) Inventors: Katherine Sophia Piggott, Bristol (GB); Paul Antony Davis, Bristol (GB); Mark John Simms, Bristol (GB)

(73) Assignee: Rolls-Royce PLC (GB)

( * ) Notice: Subject to any disclaimer, the term of this patent is extended or adjusted under 35 U.S.C. 154(b) by 739 days.

(21) Appl. No.: 13/046,167

(22) Filed: Mar. 11, 2011

(65) Prior Publication Data

US 2011/0236185 A1 Sep. 29, 2011

(30) Foreign Application Priority Data

Mar. 23, 2010 (GB) ................................. 1004765.2

(51) Int. Cl.
*F01D 11/02* (2006.01)
*F01D 11/00* (2006.01)
*F16J 15/447* (2006.01)

(52) U.S. Cl.
CPC .......... *F01D 11/001* (2013.01); *F16J 15/4472* (2013.01)
USPC ..................... 415/173.7; 415/199.5

(58) Field of Classification Search
USPC ............... 277/411, 413, 414, 415; 415/199.5, 415/173.7, 174.4, 199.4, 209.2, 193, 209.3
See application file for complete search history.

(56) References Cited

U.S. PATENT DOCUMENTS

| 2,935,296 A | 5/1960 | Hockert et al. |
|---|---|---|
| 3,245,657 A | 4/1966 | Cooper, Jr. et al. |
| 3,712,757 A | 1/1973 | Goodwin |
| 3,734,646 A | 5/1973 | Perkins |
| 4,875,830 A | 10/1989 | Trousdell et al. |
| 5,131,814 A | 7/1992 | Przytulski et al. |
| 5,259,728 A | 11/1993 | Szpunar et al. |
| 5,624,233 A | 4/1997 | King et al. |
| 6,253,632 B1 | 7/2001 | Poulek |
| 6,634,863 B1 | 10/2003 | Forrester et al. |
| 6,726,452 B2 | 4/2004 | Strassberger et al. |
| 6,929,453 B2 | 8/2005 | Kite et al. |
| 2005/0129522 A1 | 6/2005 | Kite et al. |
| 2007/0059163 A1 | 3/2007 | Tiemann |
| 2008/0018056 A1* | 1/2008 | Evans ........................... 277/590 |

FOREIGN PATENT DOCUMENTS

| DE | 3121136 A1 | 12/1982 |
|---|---|---|
| DE | 19548593 A1 | 7/1997 |
| DE | 19931765 A1 * | 1/2001 |
| EP | 1881160 A2 | 1/2008 |
| EP | 2090749 A2 | 8/2009 |

(Continued)

*Primary Examiner* — Edward Look
*Assistant Examiner* — Michael Sehn
(74) *Attorney, Agent, or Firm* — McCormick Paulding & Huber LLP

(57) ABSTRACT

An interstage seal is provided for installation between forward and aft stage discs of a turbine section of a gas turbine engine. The seal has a forward annular portion, which extends forward to contribute to an air seal at the outer periphery of the forward stage disc, and an aft annular portion, which extends rearward to contribute to an air seal at the outer periphery of the aft stage disc. The seal has a peripheral slot into which static vane inner rails are loadable. The seal includes a first component, which provides the forward annular portion, and a second component, which provides the aft annular portion. The second component is separably connectable to the first component such that the first and second components, when connected, cooperate to form the peripheral slot. Loading the static vane inner rails into the slot prevents the second component separating from the first component.

10 Claims, 5 Drawing Sheets

(56) References Cited

FOREIGN PATENT DOCUMENTS

| | | |
|---|---|---|
| EP | 2108786 A2 | 10/2009 |
| FR | 1341910 A | 11/1963 |
| GB | 1331209 A | 9/1973 |
| GB | 2171151 A | 8/1986 |
| SU | 480882 A1 | 8/1975 |
| WO | 02076665 A1 | 10/2002 |
| WO | 2005049420 A1 | 6/2005 |

* cited by examiner

INTERSTAGE SEAL

CROSS REFERENCE TO RELATED APPLICATION

This application is entitled to the benefit of British Patent Application No. GB 1004765.2, filed on Mar. 23, 2010.

FIELD OF THE INVENTION

The present invention relates to an interstage seal for installation between forward and aft stage discs of a turbine section of a gas turbine engine.

BACKGROUND OF THE INVENTION

The turbine section of a gas turbine engine includes an assembly of alternate rows of static vanes and rows of rotating blades. The rows of blades are mounted to the outer peripheries of respective discs, each disc and its row of blades being known as a stage. The interstage volume between adjacent discs is enclosed by an interstage seal extending between the outer peripheries of the discs.

FIG. 1 shows a schematic longitudinal cross-section through part of the turbine section of a conventional gas turbine engine. The turbine section has a row of intermediate pressure (IP) blades 1 mounted to an IP disc 2, and rows of low pressure (LP) blades 3 mounted to respective LP discs 4. A row of static vanes 5 separates the row of IP blades from the forwardmost row of LP blades, and further rows of static vanes 6 separate the rows of LP blades from each other.

Between the LP discs 4, the interstage volumes are enclosed by seals formed by platforms 7 at the inner sides of the static vanes 6. In addition, interstage seals 8 are bolted or doweled to rails 9 which extend from the bases of the static vanes 6 to perfect labyrinth seals 10 carried by intermediate discs 11.

Between the IP disc 2 and the forwardmost LP disc 4, the interstage volume is enclosed by forward 12 and aft 13 interstage seals which are bolted or doweled to forward and aft rails 14 which extend from the bases of the static vanes 5. These interstage seals extend respectively forward and aft to contribute to air seals at the outer peripheries of the IP disc and the forwardmost LP disc. The platforms 15 at the inner sides of the static vanes 5 also contribute to these air seals.

A problem can arise, however, that the bolts or dowels attaching the interstage seals to the static vane rails can be costly items if they are to be capable of being used at high core temperatures. Alternatively, more complicated interstage seal configurations may be required to protect the bolts or dowels from high core temperatures if the bolts or dowels rated are only capable of being used at low temperature.

SUMMARY OF THE INVENTION

Accordingly, a first aspect of the invention provides an interstage seal for installation between forward and aft stage discs of a turbine section of a gas turbine engine, the seal having:

a forward annular portion which extends forward to contribute to an air seal at the outer periphery of the forward stage disc, an aft annular portion which extends rearward to contribute to an air seal at the outer periphery of the aft stage disc, and a peripheral slot into which static vane inner rails are loadable;

wherein the seal includes a first component which provides the forward annular portion, and a second component which provides the aft annular portion and is separably connectable to the first component such that the first and second components, when connected, cooperate to form the peripheral slot and loading the static vane inner rails into the slot prevents the second component separating from the first component.

Advantageously, as the loading of the static vane inner rails into the peripheral slot prevents the second component from separating from the first component, it can be unnecessary to provide additional fastenings, such as bolts or dowels, to connect the first and second components. Thus, the interstage seal can be used in high temperature environments without recourse to special high temperature fastenings or special temperature protection features. Further, by providing two separable components, it is possible to remove just one of the components (typically the second component) to provide maintenance access to regions covered by the seal. Also, the two components can be made of different materials. The materials can be chosen for their respective thermal, mechanical and/or chemical properties. For example, the respective thermal expansion coefficients of the different materials can be selected so that, in use, clearance changes within the air seals at the outer peripheries of the forward and aft stage discs are minimised or reduced. Alternatively or additionally, the respective oxidation resistances of the different materials can be selected depending on the thermal environments of the two components.

The interstage seal may have any one or, to the extent that they are compatible, any combination of the following optional features.

Preferably, the first and second components have respective mating features which interengage when the components are connected to prevent the components from moving relative to each other. For example, the mating features can comprise a plurality of holes on one of the components and corresponding mating pins on the other component. The mating features typically prevent the components from moving radially and tangentially relative to each other.

Preferably, the second component, on connection with the first component, is slidable axially rearwardly relative to the first component to interengage the mating features of the first and second components and form the peripheral slot. The reverse movement can then be used to separate the two components.

Typically, when the first and the second components are connected, the peripheral slot is formed between opposing faces of the components. For example, the opposing faces may be formed by respective annular flanges extending from the two components.

The interstage seal may further have additional mating features which interengage with corresponding additional mating features of the static vane inner rails when the rails are loaded into the peripheral slot to prevent the interstage seal from rotating relative to the static vanes about the axis of the engine. For example, the mating features can include a plurality of pins on one of the components or on the rails and corresponding grooves on that component or on the rails, the pins travelling along the grooves as the rails are loaded into the slots. Such an arrangement can allow the vanes to grow thermally inwardly and the seal to grow thermally outwardly while retaining the interengagement.

The turbine section may have an intermediate disc between the forward stage disc and the aft stage disc, the interstage seal being configured such that the interstage seal and the intermediate disc form a labyrinth seal therebetween. Preferably, one of the first and second components (typically the first component) has a sealing face which seals to a labyrinth seal member carried by the intermediate disc.

Advantageously, the second component can be formed from a plurality of sub-components, each sub component being separately connectable to the first component and providing a respective portion of the circumferential extent of the second component. This allows the sub-components to be individually connected to and separated from the first component. Conveniently, the second component can be formed as a single annular shape, which is then cut up into the sub-components.

Accordingly, a second aspect of the invention provides a gas turbine engine having a turbine section with forward and aft stage discs and the interstage seal according to the first aspect installed between the stage discs, the forward annular portion extending forward to contribute to an air seal at the outer periphery of the forward stage disc, the aft annular portion extending rearward to contribute to an air seal at the outer periphery of the aft stage disc, and static vane inner rails being loaded into the peripheral slot. The turbine section may also have an intermediate disc between the forward stage disc and the aft stage disc, the intermediate disc and the interstage seal forming a labyrinth seal therebetween.

A third aspect of the invention provides the first component of the interstage seal according to the first aspect.

A fourth aspect of the invention provides the second component of the interstage seal according to the first aspect.

A fifth aspect of the invention provides a sub-component of the second component of the interstage seal according to the first aspect when the second component is formed from a plurality of sub-components.

DETAILED DESCRIPTION OF THE PREFERRED EMBODIMENTS

Figure 1:
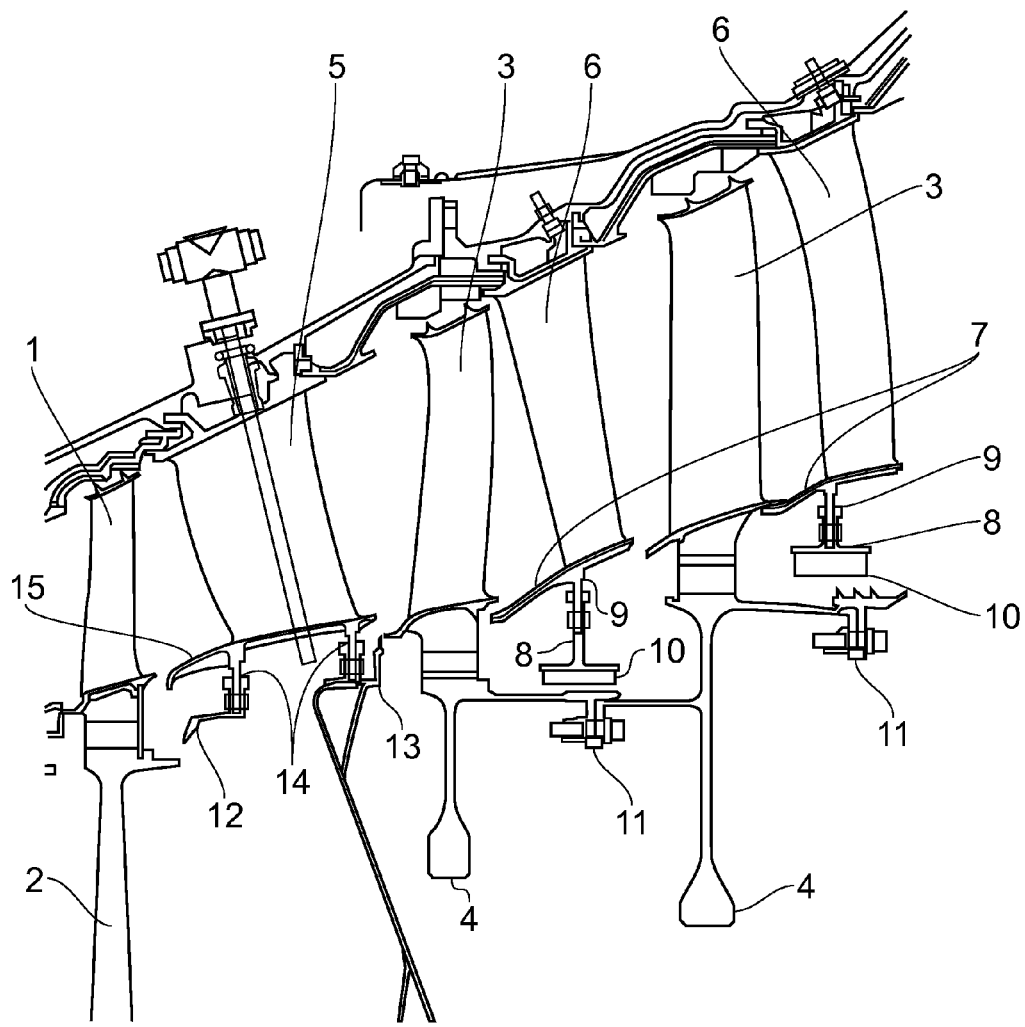
FIG. 1 shows a schematic longitudinal cross-section through part of the turbine section of a conventional gas turbine engine.
Figure 2:
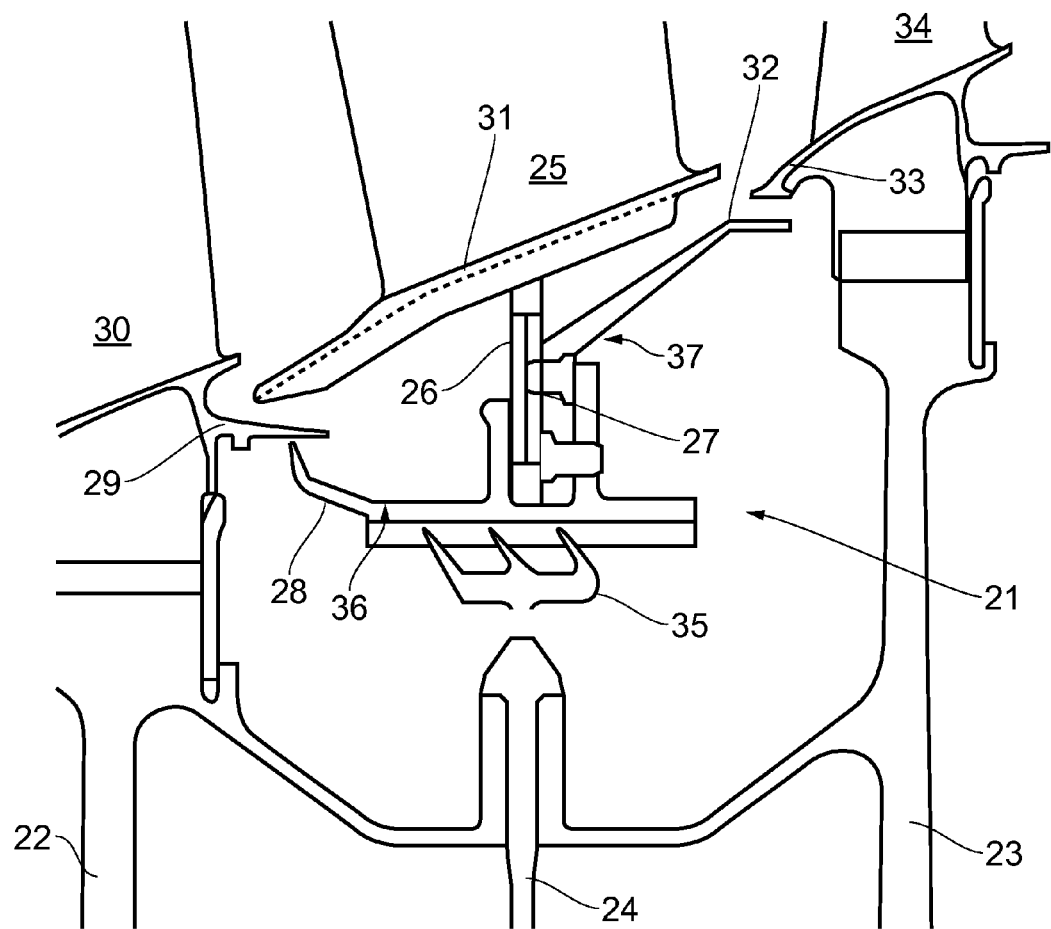
FIG. 2 shows a schematic side view of an interstage seal.

FIG. 2 shows a schematic side view of an interstage seal 21. The seal is located between a forward disc 22 and an aft disc 23, and radially outwardly of an intermediate disc 24. The seal extends between the outer peripheries of the forward and aft discs. Static vanes 25 are joined to the seal by rails 26 which extend from the bases of the vanes and are loaded into a peripheral slot 27 formed by the seal.

A forward annular portion 28 of the seal 21 extends towards the outer periphery of the forward disc 22, and cooperates with the root portions 29 of a row of blades 30 mounted to the forward disc and with the forward edge of platforms 31 at the base of the static vanes 25 to form a forward air seal.

Likewise, an aft annular portion 32 of the seal 21 extends towards the outer periphery of the aft disc 23, and cooperates with the root portions 33 of a row of blades 34 mounted to the aft disc and with the rear edge of platforms 31 to form an aft air seal.

The intermediate disc 24 carries a labyrinth seal member 35 which seals with a radially inward face of the interstage seal 21.

The interstage seal 21 is formed by two separably connectable components. The first component 36 provides the forward annular portion 28 of the seal and the inward face for sealing with the labyrinth seal member 35, and the second component 37 provides the aft annular portion 32 of the seal. Opposing faces of the first and second components form the peripheral slot 27.

FIGS. 3(a) to (d) show schematically a procedure for connecting the first 36 and second 37 components, and for loading the rails 26 into the peripheral slot 27. FIG. 4 is a schematic of a cross-sectional view through the first component. FIG. 5 shows respectively (a) a schematic view of the rear side of a sub-component of the second component and (b) a schematic view of a portion of the front side of the sub-component. FIG. 6 shows a schematic view of the rear side of a portion of a rail 26.

Figure 3A:
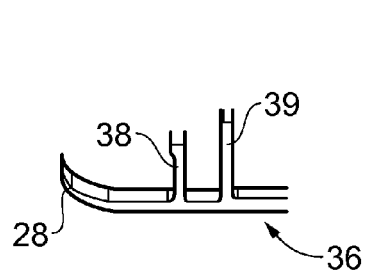
FIGS. 3(a) to (d) show schematically a procedure for connecting two components to form the interstage seal of FIG. 2 and for loading static vane rails into a peripheral slot of the interstage seal.
Figure 4:
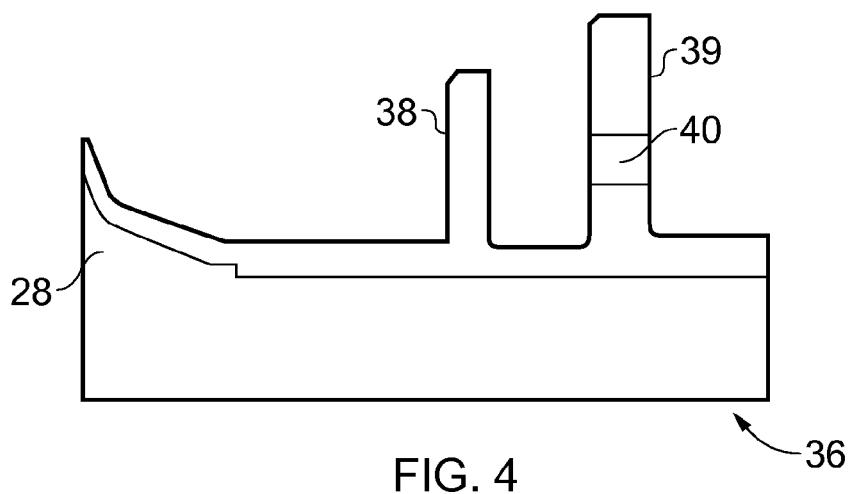
FIG. 4 is a schematic a cross-sectional view through the first component of the interstage seal of FIG. 2.
Figure 5A:
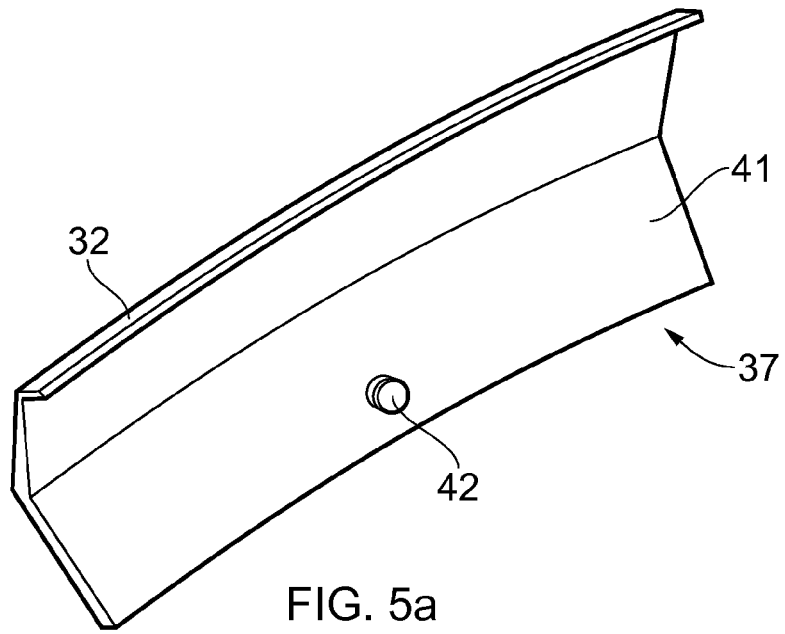
FIG. 5 shows respectively (a) a schematic view of the rear side of a sub-component of the second component of the interstage seal of FIG. 2 and (b) a schematic view of a portion of the front side of the sub-component.

The first component 36 is annular in shape and, as shown in FIG. 3(a) and FIG. 4, has axially spaced, forward 38 and aft 39 annular flanges. The aft annular flange has a plurality of circumferentially spaced holes 40.

Figure 3B:
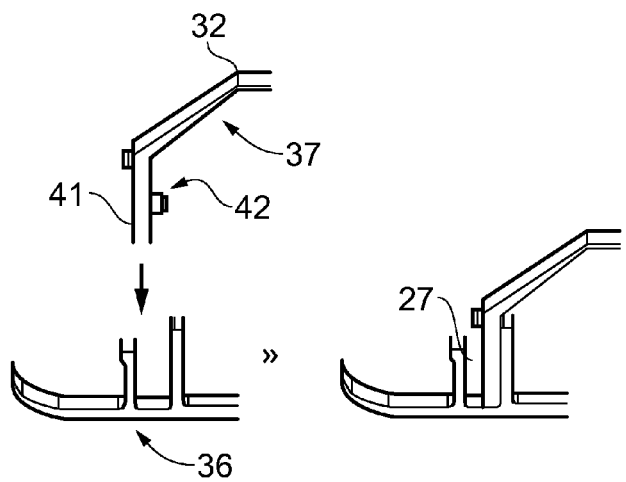

The second component 37 is also annular in shape, and is formed from a plurality of (e.g. two) sub-components which each provide a respective portion (e.g. half) of the second component. When positioned end-to-end in a circle, the sub-components define the complete annulus of the second component. However, conveniently, each sub-component can be separately connected to the first component. The sub-components can be formed by turning the second component as a complete ring, and then cutting the ring into matched sections, for example by wire cutting. As shown in FIG. 3(b) and FIG. 5(a), each sub-component, has a connecting flange 41 which is received into the gap between the forward 38 and aft 39 annular flanges of the first component. The connecting flange has one or more circumferentially spaced rearward facing pins 42. The width of the gap is slightly greater than the thickness of the connecting flange plus the protruding length of the pins to allow the flange and pins to enter the gap. On reception of the connecting flange into the gap, the pins align with the holes 40. The pins then enter the holes when the second component is subsequently slid backwards relative to the first component. The interengagement of the pins and the holes prevents the first and second components from moving radially and tangentially relative to each other. Preferably, as a failsafe measure, there is more than one pin/hole pair per sub-component.

Figure 3C:
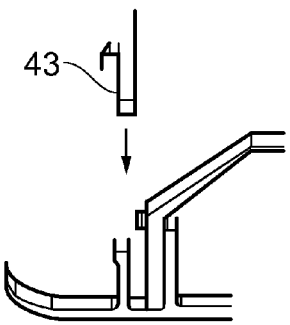
Figure 3D:
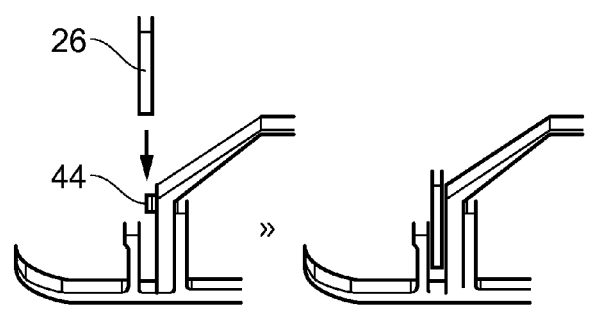

By sliding the connecting flanges 41 of the sub-components rearwardly in the gap between the forward 38 and aft 39 annular flanges, the peripheral slot 27 is formed as a gap of reduced width between the forward annular flange and the connecting flanges. As shown in FIG. 3(c), an anti-fret liner 43 is positioned in the peripheral slot.

Figure 5B:
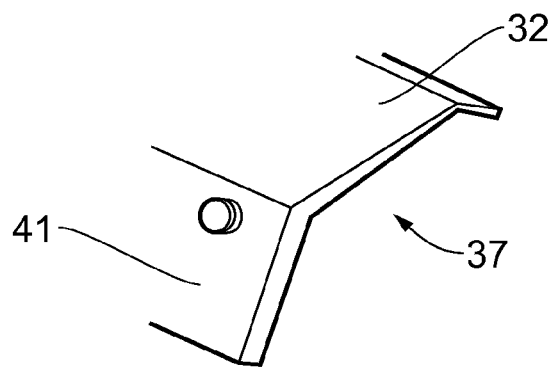
Figure 6:
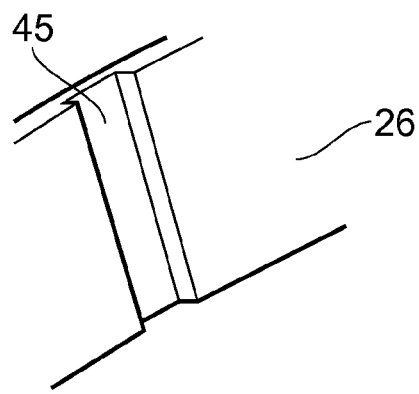
FIG. 6 shows a schematic view of the rear side of a portion of a static vane rail.
Figure 7A:
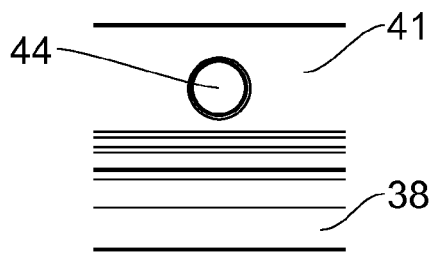
FIG. 7 shows schematically (a) a front view of a portion of a connecting flange of a sub-component of the second component of the interstage seal of FIG. 2, the connecting flange being located in the peripheral slot of the interstage seal, and (b) a cross-sectional view of a static vane rail and a top view of an aft annular portion of the interstage seal.
Figure 7B:
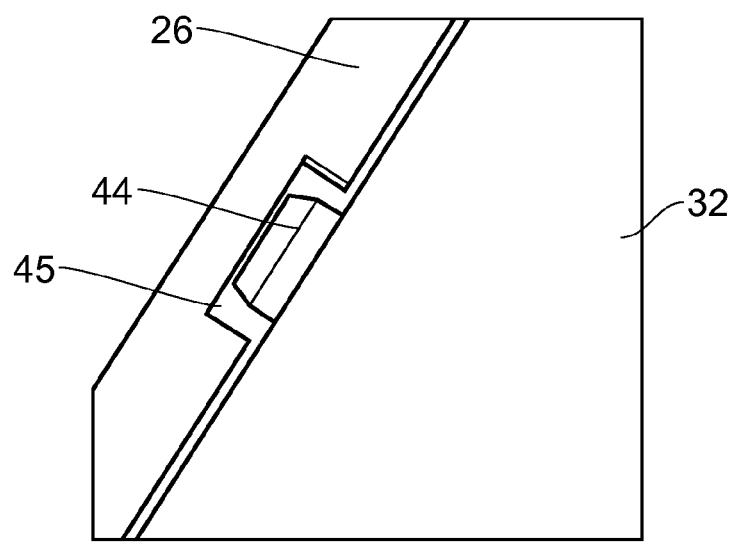

The second component 37 also has a plurality of circumferentially spaced forward facing pins 44, shown in FIG. 5(b), on the connecting flanges 41. These pins are higher than the rearward facing pins 42, and protrude above the entrance to the reduced gap. FIG. 7(*a*) shows schematically a front view of a portion of a connecting flange positioned in the reduced gap, the forward facing pin at that portion of the connecting flange sitting radially higher than the outer extremity of the forward annular flange 38.

Next, referring to FIG. 3(*d*), the rails 26 of the static vanes are slotted into the peripheral slot 27. As shown in FIG. 6, the rear side of each rail 26 has a radially extending groove 45. On slotting the rail into the peripheral slot, a corresponding one of the forward facing pins enters and travels along this groove. The interengagement of the forward facing pins and the grooves prevents the interstage seal from moving radially relative to the static vanes 21. Also, the pin and groove arrangement permits the vanes to grow thermally inwardly and the seal to grow thermally outwardly while remaining interengaged. Further, the positioning of the rails in the peripheral slot prevents the first 36 and second 37 components from separating, as the second component 37 cannot move forward to disengage the rearward facing pins 42 from the holes 40. FIG. 7(*b*) shows schematically a cross-sectional view of a rail and a top view of the aft annular portion 32 of the second component 37 at one of the pairs of interengaging forward facing pins and grooves.

Advantageously, the interstage seal 21 can be mechanically fastened to the static vanes 25 without recourse to bolts or dowels, which facilitates the use of the seal in high temperature environments. For example, there is no need to provide special thermal protection for bolts or dowels. Further, special tooling is not required to assemble and disassemble the seal, which avoids the need to leave space around the seal for insertion of that tooling.

By forming the seal as a two-part component, it is possible to remove, e.g. just the second component 37, to provide access to regions beneath the seal. Further, the two components 36, 37 can be made of different materials depending on their respective thermal environments. For example, the components can have respective thermal expansion coefficients that are selected to reduce or minimise changes in the clearances between the forward annular portion 28 and the root portions 29, and between the aft annular portions 32 and the root portions 33.

While the invention has been described in conjunction with the exemplary embodiments described above, many equivalent modifications and variations will be apparent to those skilled in the art when given this disclosure. For example, the pin and hole, and pin and groove mating features could be reversed so that the male and female features are on the opposing parts. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. An interstage seal for installation between forward and aft stage discs of a turbine section of a gas turbine engine, the seal comprising:
    a forward annular portion which extends forward to contribute to an air seal at the outer periphery of the forward stage disc,
    an aft annular portion which extends rearward to contribute to an air seal at the outer periphery of the aft stage disc, and
    a peripheral slot into which static vane inner rails are loadable;
    wherein the seal comprises a first component which provides the forward annular portion, and a second component which provides the aft annular portion and is separably connectable to the first component such that the first and second components, when connected, cooperate to form the peripheral slot and loading the static vane inner rails into the slot prevents the second component from separating from the first component, and
    wherein one of the first component or the second component has a male mating feature and the other of the first component or the second component has a female mating feature, and when the first and second components are connected the mating features interengage to prevent relative movement of the first and second components,
    wherein the second component, on connection with the first component, is slidable axially rearwardly relative to the first component to interengage the mating features of the first and second components and form the peripheral slot.

2. An interstage seal according to claim 1, wherein, when the first and the second components are connected, the peripheral slot is formed between opposing faces of the components.

3. An interstage seal according to claim 1 wherein at least one of the first component or the second component further comprises additional mating features which interengage with corresponding additional mating features of the static vane inner rails when the rails are loaded into the peripheral slot to prevent the interstage seal from rotating relative to the static vanes about the axis of the engine.

4. An interstage seal according to claim 1, wherein the turbine section has an intermediate disc between the forward stage disc and the aft stage disc, the interstage seal being configured such that the interstage seal and the intermediate disc form a labyrinth seal therebetween.

5. An interstage seal according to claim 1, wherein the second component is formed from a plurality of sub-components, each sub component being separately connectable to the first component and providing a respective portion of the circumferential extent of the second component.

6. An interstage seal according to claim 1, wherein the mating features comprise a plurality of holes on one of the components and corresponding mating pins on the other component.

7. A method for connecting a second component to a first component to form an interstage seal assembly between forward and aft stage discs of a turbine section of a gas turbine engine comprising the steps of:
    interengaging mating features on the first and second components such that the male and female mating features prevent the first and second components from moving radially and tangentially relative to each other, the first and second components co-operate to form a peripheral slot, the first component has a forward annular portion extending forward to contribute to an air seal at the outer periphery of the forward stage disc, and the second component has an aft annular portion extending rearward to contribute to an air seal at the outer periphery of the aft stage disc; and
    loading a static vane inner rail into the peripheral slot to prevent the second component from separating from the first component,
    wherein the step of interengaging respective male and female mating features on the first and second components includes the step of sliding the second component axially rearwardly relative to the first component.

8. A method according to claim 7 wherein the step of loading the static vane inner rail into the peripheral slot includes the step of interengaging additional mating features on one of the first or second components with corresponding additional mating features of the static vane inner rail preventing the first and second components from rotating relative to the static vane inner rail about the axis of the engine.

9. An interstage seal for installation between forward and aft stage discs of a turbine section of a gas turbine engine, the seal comprising:

a forward annular portion which extends forward to contribute to an air seal at the outer periphery of the forward stage disc, an aft annular portion which extends rearward to contribute to an air seal at the outer periphery of the aft stage disc, and a peripheral slot into which static vane inner rails are loadable;

wherein the seal comprises a first component which provides the forward annular portion, and a second component which provides the aft annular portion and is separably connectable to the first component such that the first and second components, when connected, cooperate to form the peripheral slot and loading the static vane inner rails into the slot prevents the second component from separating from the first component, wherein one of the first component or the second component has a male mating feature and the other of the first component or the second component has a female mating feature, and when the first and second components are connected the mating features interengage to prevent relative movement of the first and second components, and wherein at least one of the first component or the second component further comprises additional mating features which interengage with corresponding additional mating features of the static vane inner rails when the rails are loaded into the peripheral slot to prevent the interstage seal from rotating relative to the static vanes about the axis of the engine.

10. An interstage seal according to claim 9, wherein the additional mating features comprise a plurality of pins and corresponding grooves, arranged such that the pin can travel along the groove as the static vane rails are moved into the peripheral slot.

* * * * *